United States Patent
Stachniak et al.

(10) Patent No.: US 11,010,965 B2
(45) Date of Patent: *May 18, 2021

(54) VIRTUAL OBJECT PLACEMENT FOR AUGMENTED REALITY

(71) Applicant: Microsoft Technology Licensing, LLC, Redmond, WA (US)

(72) Inventors: Szymon Piotr Stachniak, Seattle, WA (US); Hendrik Mark Langerak, Bellevue, WA (US); Michelle Brook, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/925,728

(22) Filed: Jul. 10, 2020

(65) Prior Publication Data

US 2020/0342660 A1 Oct. 29, 2020

Related U.S. Application Data

(63) Continuation of application No. 16/294,748, filed on Mar. 6, 2019, now Pat. No. 10,740,960.

(60) Provisional application No. 62/791,625, filed on Jan. 11, 2019.

(51) Int. Cl.
| | |
|---|---|
| *G06T 17/00* | (2006.01) |
| *G06T 19/00* | (2011.01) |
| *G06T 19/20* | (2011.01) |

(52) U.S. Cl.
CPC ............ *G06T 17/00* (2013.01); *G06T 19/006* (2013.01); *G06T 19/20* (2013.01); *G06T 2200/08* (2013.01)

(58) Field of Classification Search
CPC ....... G06T 17/00; G06T 19/006; G06T 19/20; G06T 2200/08
USPC .................................................. 345/419, 619
See application file for complete search history.

(56) References Cited

U.S. PATENT DOCUMENTS

| | | | | |
|---|---|---|---|---|
| 2015/0332508 | A1* | 11/2015 | Jovanovic | G06T 13/205 345/427 |
| 2016/0025981 | A1* | 1/2016 | Burns | G02B 27/0101 345/156 |
| 2017/0212585 | A1* | 7/2017 | Kim | G06F 3/013 |
| 2017/0287218 | A1* | 10/2017 | Nuernberger | G06T 19/20 |
| 2018/0246631 | A1* | 8/2018 | Maruyama | H04N 13/282 |
| 2018/0300952 | A1* | 10/2018 | Evans | G06F 3/04845 |
| 2018/0350145 | A1* | 12/2018 | Byl | G06F 3/017 |

* cited by examiner

*Primary Examiner* — Jacinta M Crawford
(74) *Attorney, Agent, or Firm* — Alleman Hall Creasman & Tuttle LLP

(57) ABSTRACT

An augmented reality device includes a logic machine and a storage machine holding instructions executable by the logic machine to, for one or more real-world surfaces represented in a three-dimensional representation of a real-world environment of the augmented reality device, fit a virtual two-dimensional plane to the real-world surface. A request to place a virtual three-dimensional object on the real-world surface is received. For each of a plurality of candidate placement locations on the virtual two-dimensional plane, the candidate placement location is evaluated as a valid placement location or an invalid placement location for the virtual three-dimensional object. An invalidation mask is generated that defines the valid and invalid placement locations on the virtual two-dimensional plane.

20 Claims, 6 Drawing Sheets

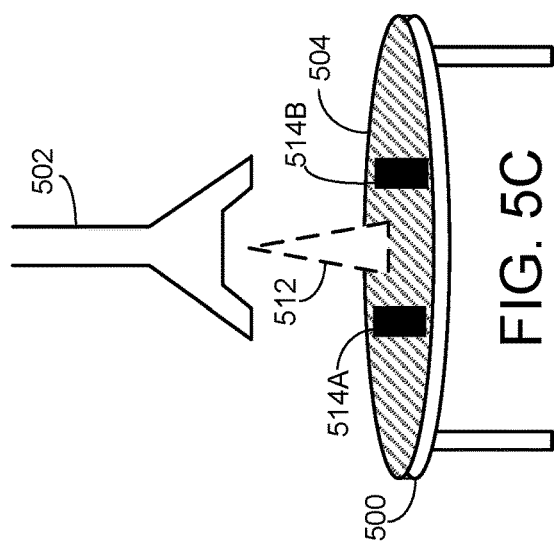
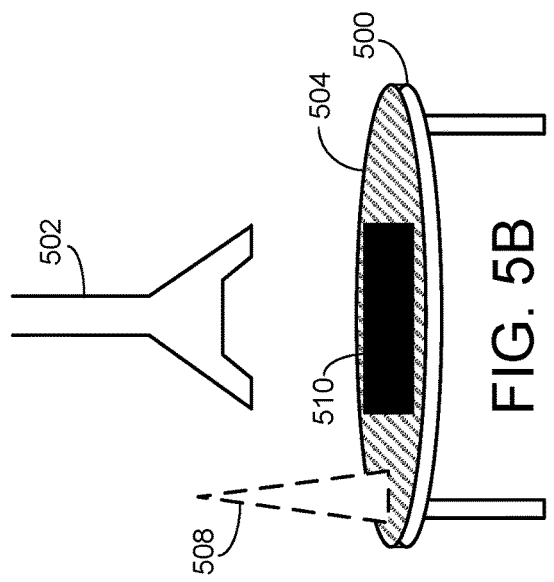
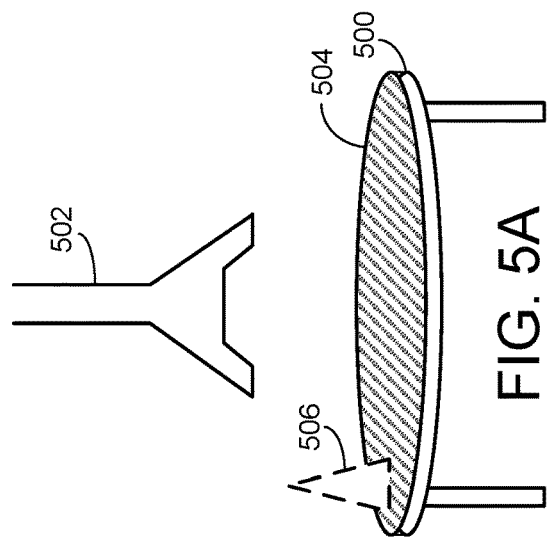
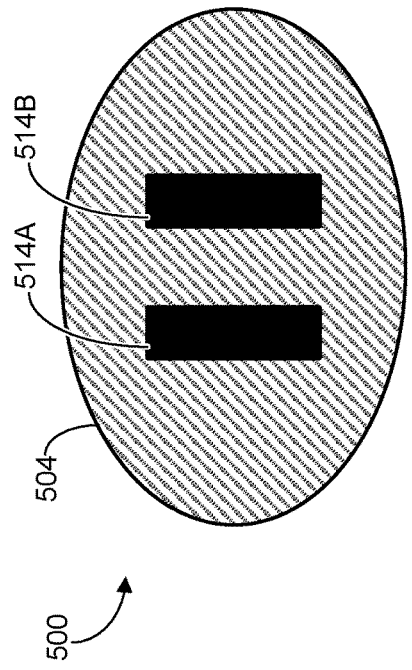

VIRTUAL OBJECT PLACEMENT FOR AUGMENTED REALITY

CROSS REFERENCE TO RELATED APPLICATIONS

This application is a continuation from U.S. Non-Provisional patent application Ser. No. 16/294,748 filed Mar. 6, 2019, which claims priority to U.S. Provisional Patent Application Ser. No. 62/791,625, filed Jan. 11, 2019, the entirety of each of which is hereby incorporated herein by reference for all purposes.

BACKGROUND

Virtual objects may be presented via a variety of portable and/or stationary display devices, including via head-mounted display devices (HMDs). Such devices can be used to provide augmented reality (AR) experiences and/or virtual reality (VR) experiences by presenting virtual imagery to a user. The virtual imagery may be moved, rotated, resized, and/or otherwise manipulated based on user input.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

An augmented reality device includes a logic machine and a storage machine holding instructions executable by the logic machine to, for one or more real-world surfaces represented in a three-dimensional representation of a real-world environment of the augmented reality device, fit a virtual two-dimensional plane to the real-world surface. A request to place a virtual three-dimensional object on the real-world surface is received. For each of a plurality of candidate placement locations on the virtual two-dimensional plane, the candidate placement location is evaluated as a valid placement location or an invalid placement location for the virtual three-dimensional object. An invalidation mask is generated that defines the valid and invalid placement locations on the virtual two-dimensional plane.

BRIEF DESCRIPTION OF THE DRAWINGS

FIGS. 5A-5D schematically illustrate visual indication of valid and invalid placement locations for a virtual three-dimensional object on a virtual two-dimensional plane.

DETAILED DESCRIPTION

Augmented reality (AR) devices are configured to present virtual images that appear to augment or replace a real-world environment. Such devices are often used to present virtual images that mimic three-dimensional (3D) objects and appear to be physically present in the real-world. An augmented reality device may provide functionality that allows a user of the device to manipulate or move such virtual objects—for instance, to place a virtual chess pieces on a real-world chessboard.

To this end, augmented reality devices often build or otherwise acquire detailed three-dimensional representations of their real-world surroundings. As one example, the three-dimensional representation may take the form of a dense 3D mesh of 3D vertices and/or a voxelized model representing the real-world surroundings of the augmented reality device. Virtual images can then be presented with respect to this three-dimensional representation—for instance, to give the illusion that virtual objects are placed on or affixed to real surfaces, or that virtual objects realistically collide with real-world objects as they are moved. When the six degree-of-freedom (6DOF) pose of the augmented reality device is known and tracked in real time, the virtual objects can be presented in a "world-locked" state, in which the virtual objects appear to maintain fixed positions in the real-world environment even as the augmented reality device moves. For instance, the virtual chess piece may appear to maintain its position on the virtual chessboard even when viewed from different angles and distances.

Figure 1:
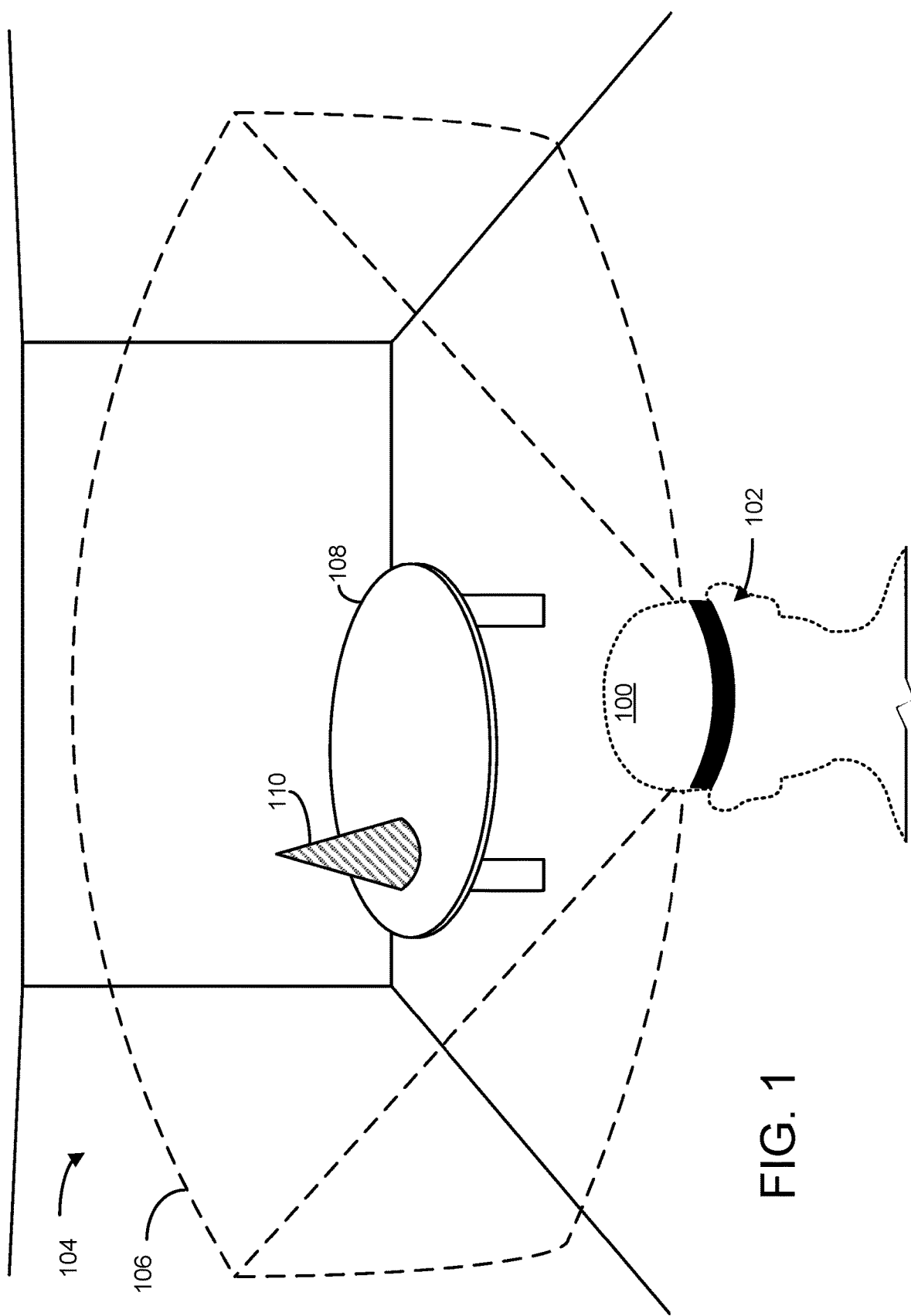
FIG. 1 schematically shows an example real-world environment including real and virtual objects.

This is illustrated in FIG. 1, which schematically shows an example user 100 using an augmented reality device 102 to view a real-world environment 104. The augmented reality device has an associated field-of-view (FOV) 106, which represents the area in which the augmented reality device can display virtual imagery that is viewable by user 100. Real-world environment 104 includes a real-world table 108. Furthermore, augmented reality device 102 is displaying virtual imagery that appears as a virtual object 110 from the perspective of user 100. Specifically, virtual object 110 takes the form of a cone that appears to have a fixed position on real-world table 108.

As discussed above, the augmented reality device 102 may maintain a three-dimensional representation of the physical environment. For instance, such a representation may define the positions and dimensions of real-world table 108, the floor, walls, and ceiling of the real-world environment, as well as any other objects or surfaces present in the real-world environment. By tracking the pose of the augmented reality device relative to the three-dimensional representation of the real-world environment as the augmented reality device moves, the device is able to dynamically alter its presentation of virtual imagery such that virtual object 110 appears to maintain the same position on real-world table 108.

However, calculating and maintaining the three-dimensional representation of the real-world environment is often resource-intensive for the augmented reality device. For instance, a three-dimensional mesh representation of a real-world environment may include thousands of discrete points, or 3D voxels, the positions of which are often tracked and updated many times per second. Furthermore, it can be very resource intensive to integrate virtual objects into a modeled real-world environment when the real-world model includes thousands or even millions of vertices, voxels, or other data points. Using such dense models can be taxing on processing and rendering components of the augmented reality device, consuming processing power and electrical power. Furthermore, frame-to-frame variations in sensor data associated with updating the three-dimensional representation can result in undesirable "jitter" artifacts, in which virtual images appear to flicker or move slightly relative to their intended positions.

Accordingly, the present disclosure describes techniques for fitting virtual two-dimensional planes to real-world surfaces in the real-world environment based on a three-dimensional representation of the environment. The virtual two-dimensional planes can then be used as substrates for placing virtual objects that appear to occupy fixed positions on the real-world surfaces, allowing processing resources of the augmented reality device to be conserved while mitigating unsightly visual artifacts due to the relative simplicity of the virtual two-dimensional planes when compared to denser 3D voxel and/or mesh models.

Furthermore, because information about the three-dimensional arrangement of the environment is still known, the augmented reality device may be configured to evaluate, for a plurality of candidate locations on a virtual two-dimensional plane, whether such locations are valid or invalid placement locations for a virtual three-dimensional object. For instance, based at least on a length of the virtual three-dimensional object in a direction perpendicular to the virtual two-dimensional plane (e.g., the height of the object when the plane is horizontal), the augmented reality device may evaluate whether the object would collide with another nearby real-world or virtual object if placed at a particular position on the real-world surface to which the virtual two-dimensional plane is fit. The augmented reality device may then calculate valid and invalid placement locations on the virtual two-dimensional plane. The determined valid and invalid locations optionally may be visually indicated in some scenarios, for instance using color coding, unique visual patterns (e.g., symbols, fill patterns), or another suitable visual indicator superimposed on the real-world surface. In some scenarios, the valid and invalid locations may be used to automatically place virtual objects on a surface (e.g., automatically center a virtual object on a recognized real-world surface). In this manner, the augmented reality device may conserve processing resources associated with maintaining complex environment representations while still providing robust virtual object placement functionality.

Figure 2:
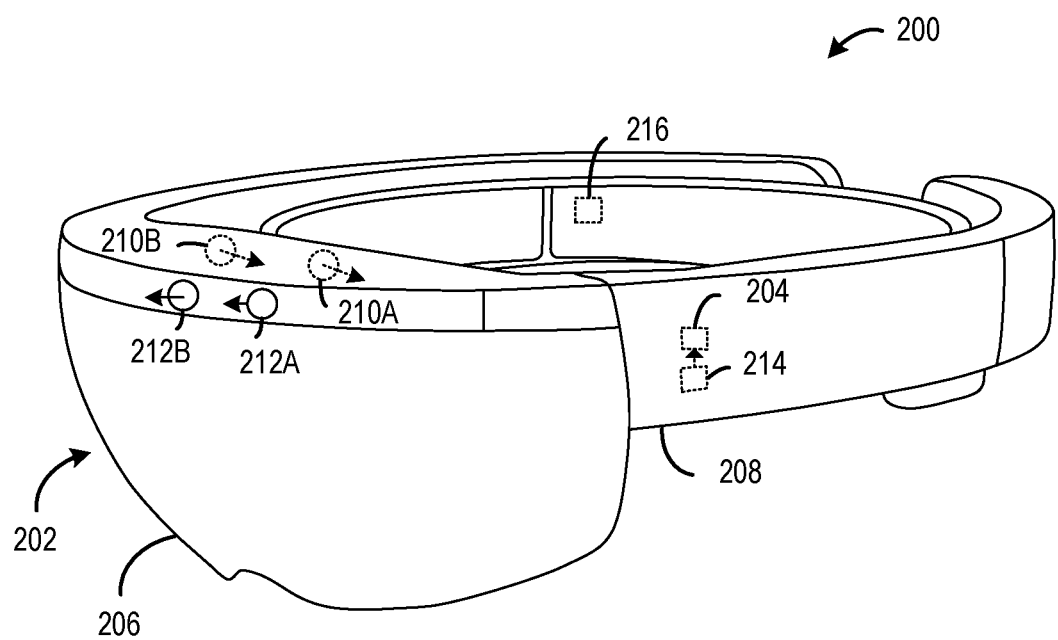
FIG. 2 schematically shows an example augmented reality device.

FIG. 2 shows aspects of an example augmented reality computing system 200 including a near-eye display 202. The augmented reality computing system 200 is a non-limiting example of the augmented reality devices described herein and is usable for presenting virtual images such that they appear to occupy fixed positions within a real-world environment. Any or all of the augmented reality devices described herein may be implemented as computing system 600 described below with respect to FIG. 6. It is to be understood that augmented reality devices as described herein also include mixed reality devices.

The augmented reality computing system 200 may be configured to present any suitable type of augmented reality experience. In some implementations, the augmented reality experience includes an augmented-reality experience in which the near-eye display 202 is wholly or partially transparent from the perspective of the wearer, to give the wearer a clear view of a surrounding physical space. In such a configuration, the near-eye display 202 is configured to direct display light to the user's eye(s) so that the user will see virtual objects that are not actually present in the physical space. In other words, the near-eye display 202 may direct display light to the user's eye(s) while light from the physical space passes through the near-eye display 202 to the user's eye(s). As such, the user's eye(s) simultaneously receive light from the physical environment and display light.

Alternatively, the near-eye display may be fully opaque and display a video feed of the real-world environment captured by a camera. Virtual imagery may be intermixed with the video feed to provide an augmented-reality experience.

Regardless of the type of augmented-reality experience that is provided, the augmented reality computing system 200 may be configured to visually present virtual objects that appear body-locked and/or world-locked. A body-locked virtual object may appear to move along with a perspective of the user as a pose (e.g., a 6DOF pose) of the augmented reality computing system 200 changes. As such, a body-locked virtual object may appear to occupy the same portion of the near-eye display 202 and may appear to be at the same distance from the user, even as the user moves around the physical space. Alternatively, a world-locked virtual object may appear to remain at a fixed location in the physical space even as the pose of the augmented reality computing system 200 changes.

The augmented reality computing system 200 may take any other suitable form in which a transparent, semi-transparent, and/or non-transparent display augments a real-world view with virtual objects. While the illustrated augmented reality computing system 200 is a wearable device that presents virtual images via a near-eye display, this is not required. For instance, an alternative augmented reality device may take the form of a handheld device, such as a mobile phone or tablet computer, that presents a live video feed of a real-world environment on a display of the device along with intermixed virtual imagery. In other words, implementations described herein may be used with any other suitable computing device, including but not limited to wearable computing devices, mobile computing devices, laptop computers, desktop computers, smart phones, tablet computers, heads-up-displays, etc.

Any suitable mechanism may be used to display images via the near-eye display 202. For example, the near-eye display 202 may include image-producing elements located within lenses 206. As another example, the near-eye display 202 may include a display device, such as a liquid crystal on silicon (LCOS) device or OLED microdisplay located within a frame 208. In this example, the lenses 206 may serve as, or otherwise include, a light guide for delivering light from the display device to the eyes of a wearer. Additionally, or alternatively, the near-eye display 202 may present left-eye and right-eye virtual images via respective left-eye and right-eye displays.

The augmented reality computing system 200 includes an on-board computer 204 configured to perform various operations related to receiving user input (e.g., gesture recognition, eye gaze detection), visual presentation of virtual images on the near-eye display 202, and other operations described herein. Some to all of the computing functions described herein as being performed by an on-board computer may instead be performed by one or more off-board computers.

The augmented reality computing system 200 may include various sensors and related systems to provide information to the on-board computer 204. Such sensors may include, but are not limited to, one or more inward facing image sensors 210A and 210B, one or more outward facing image sensors 212A and 212B, an inertial measurement unit (IMU) 214, and one or more microphones 216. The one or more inward facing image sensors 210A, 210B may be configured to acquire gaze tracking information from a wearer's eyes (e.g., sensor 210A may acquire image data for one of the wearer's eye and sensor 210B may acquire image data for the other of the wearer's eye).

The on-board computer 204 may be configured to determine gaze directions of each of a wearer's eyes in any suitable manner based on the information received from the image sensors 210A, 210B. The one or more inward facing image sensors 210A, 210B, and the on-board computer 204 may collectively represent a gaze detection machine configured to determine a wearer's gaze target on the near-eye display 202. In other implementations, a different type of gaze detector/sensor may be employed to measure one or more gaze parameters of the user's eyes. Examples of gaze parameters measured by one or more gaze sensors that may be used by the on-board computer 204 to determine an eye gaze sample may include an eye gaze direction, head orientation, eye gaze velocity, eye gaze acceleration, change in angle of eye gaze direction, and/or any other suitable tracking information. In some implementations, eye gaze tracking may be recorded independently for both eyes.

The one or more outward facing image sensors 212A, 212B may be configured to measure physical environment attributes of a physical space. In one example, image sensor 212A may include a visible-light camera configured to collect a visible-light image of a physical space. In another example, the augmented reality computing system may include a stereoscopic pair of visible-light cameras. Further, the image sensor 212B may include a depth camera configured to collect a depth image of a physical space. More particularly, in one example, the depth camera is an infrared time-of-flight depth camera. In another example, the depth camera is an infrared structured light depth camera.

Data from the outward facing image sensors 212A, 212B may be used by the on-board computer 204 to detect movements, such as gesture-based inputs or other movements performed by a wearer or by a person or physical object in the physical space. In one example, data from the outward facing image sensors 212A, 212B may be used to detect a wearer input performed by the wearer of the augmented reality computing system 200, such as a gesture. Data from the outward facing image sensors 212A, 212B may be used by the on-board computer 204 to determine direction/location and orientation data (e.g., from imaging environmental features) that enables position/motion tracking of the augmented reality computing system 200 in the real-world environment. In some implementations, data from the outward facing image sensors 212A, 212B may be used by the on-board computer 204 to construct still images and/or video images of the surrounding environment from the perspective of the augmented reality computing system 200.

The IMU 214 may be configured to provide position and/or orientation data of the augmented reality computing system 200 to the on-board computer 204. In one implementation, the IMU 214 may be configured as a three-axis or three-degree of freedom (3 DOF) position sensor system. This example position sensor system may, for example, include three gyroscopes to indicate or measure a change in orientation of the augmented reality computing system 200 within 3D space about three orthogonal axes (e.g., roll, pitch, and yaw).

In another example, the IMU 214 may be configured as a six-axis or six-degree of freedom (6DOF) position sensor system. Such a configuration may include three accelerometers and three gyroscopes to indicate or measure a change in location of the augmented reality computing system 200 along three orthogonal spatial axes (e.g., x, y, and z) and a change in device orientation about three orthogonal rotation axes (e.g., yaw, pitch, and roll). In some implementations, position and orientation data from the outward facing image sensors 212A, 212B and the IMU 214 may be used in conjunction to determine a position and orientation (or 6DOF pose) of the augmented reality computing system 200.

The augmented reality computing system 200 may also support other suitable positioning techniques, such as GPS or other global navigation systems. Further, while specific examples of position sensor systems have been described, it will be appreciated that any other suitable sensor systems may be used. For example, head pose and/or movement data may be determined based on sensor information from any combination of sensors mounted on the wearer and/or external to the wearer including, but not limited to, any number of gyroscopes, accelerometers, inertial measurement units, GPS devices, barometers, magnetometers, cameras (e.g., visible light cameras, infrared light cameras, time-of-flight depth cameras, structured light depth cameras, etc.), communication devices (e.g., WIFI antennas/interfaces), etc.

The one or more microphones 216 may be configured to measure sound in the physical space. Data from the one or more microphones 216 may be used by the on-board computer 204 to recognize voice commands provided by the wearer to control the augmented reality computing system 200.

The on-board computer 204 may include a logic machine and a storage machine, discussed in more detail below with respect to FIG. 6, in communication with the near-eye display 202 and the various sensors of the augmented reality computing system 200.

Figure 3:
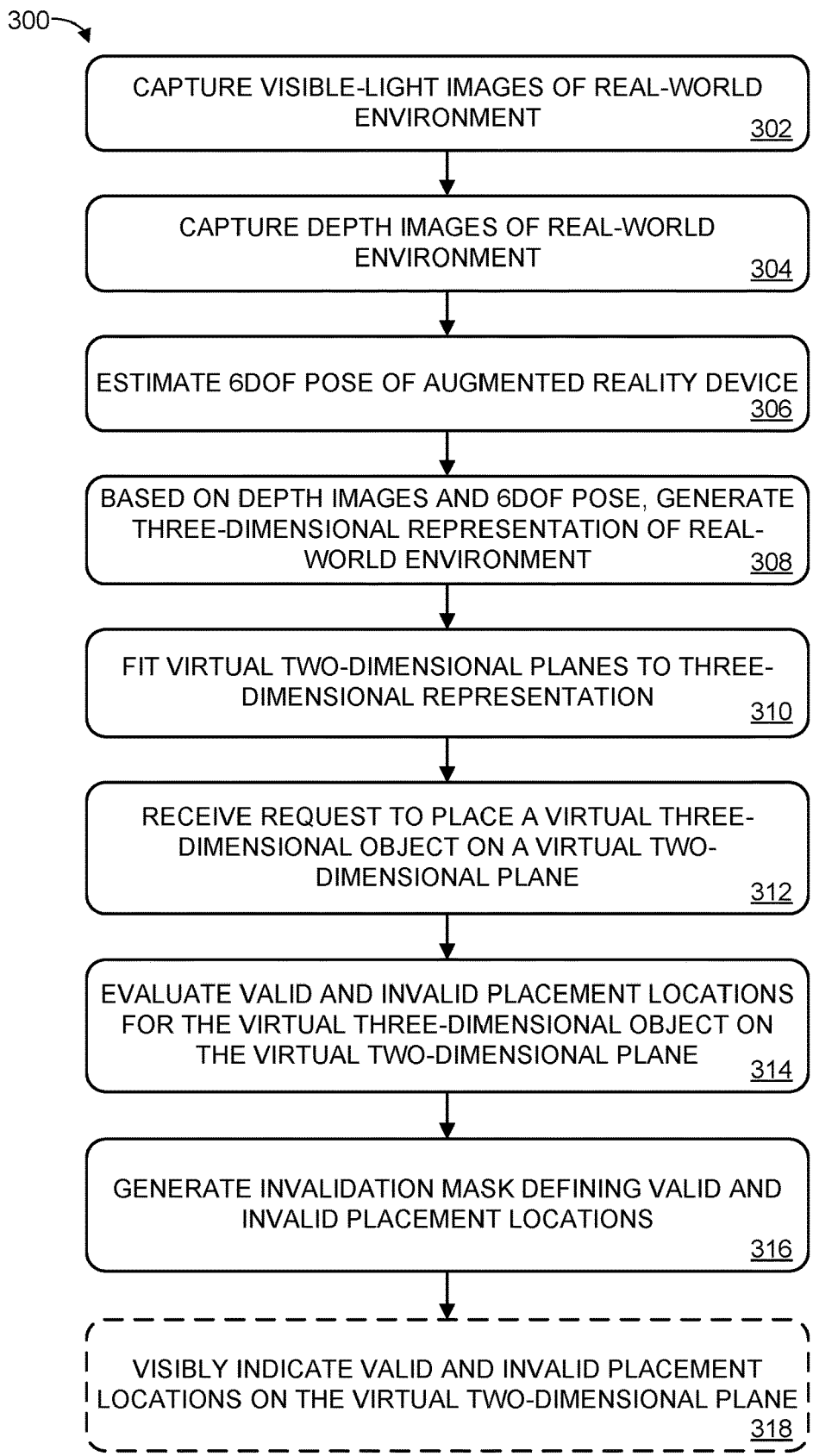
FIG. 3 illustrates an example method for evaluating virtual object placement locations.

As discussed above, augmented reality devices often maintain three-dimensional representations of their real-world environments. FIG. 3 illustrates an example method 300 for generating such three-dimensional representations, as well as fitting virtual two-dimensional planes to the three-dimensional representation and evaluating valid and invalid object placement locations on the virtual two-dimensional planes. Method 300 may be performed by on-board computing resources, off-board computing resources, or a combination of on- and off-board computing resources.

At 302, method 300 includes capturing visible-light images of the real-world environment. At 304, method 300 includes capturing depth images of the real-world environment. This may be done using suitable visible-light cameras and depth cameras of the augmented reality device—for instance, outward-facing image sensors 212A and 212B of augmented reality computing system 200. Such visible-light cameras and depth cameras may utilize any suitable technologies and need not be included in a same device housing as the augmented reality device. Furthermore, the visible-light and depth images may be captured with any suitable frequency. In some implementations, only visible light images or only depth images are used. In some implementations, other types of images, such as multi-channel spectral images may be used.

At 306, method 300 includes, based on sensor input (e.g., the visible-light and depth images of the real-world environment and/or IMU signals), estimating a 6DOF pose of the augmented reality device. This may be done in any suitable way. In one example, the current pose of the augmented reality device may be determined using a vision-based simultaneous localization and mapping (SLAM) pose tracking approach. Vision-based SLAM may use visual feature tracking of image keyframes in combination with position data (e.g., provided by an inertial measurement unit (IMU)) to track a pose of the augmented reality device relative to a local coordinate system (or local coordinate frame).

By employing the SLAM pose tracking approach, pose estimation may be robustly performed while reducing drift error. In particular, the error in pose estimation relative to any given local coordinate frame may be related to a distance from the local coordinate frame to the estimated pose. Because multiple local coordinate frames are connected, a distance from a pose estimation to any given local coordinate frame may be small enough to provide a level of pose estimation accuracy suitable for generating a relatively high-accuracy 6DOF pose of the augmented reality device.

SLAM is merely one example approach for determining a pose of the augmented reality device, and any suitable estimation approach may be used.

At 308, method 300 includes generating a three-dimensional representation of the real-world environment of the augmented reality device. This may be done in a variety of suitable ways. As inputs, the augmented reality device may consider the visible-light images of the real-world environment, the depth images of the real-world environment, the estimated 6DOF pose of the augmented reality device, sensor data from the augmented reality device (e.g., from an IMU or GPS sensor), preexisting information regarding the real-world environment (e.g., previously calculated 3D maps), etc. As one example, the three-dimensional representation may take the form of a dense three-dimensional mesh. One non-limiting example approach for generating such a mesh is described in U.S. Pat. No. 8,587,583, issued Nov. 19, 2013, the entirety of which is hereby incorporated herein by reference. However, it will be understood that any other suitable approach for generating or otherwise acquiring a three-dimensional representation of an environment may additionally or alternatively be used without departing from the intended scope of this disclosure.

The augmented reality device need not generate the three-dimensional environment representation of the real-world environment on-the-fly. Rather, in some scenarios, the three-dimensional environment representation may be generated by the augmented reality device offline, or generated by a different device entirely and simply loaded onto the augmented reality device when needed. Thus, the augmented reality device may be described as "recognizing" the three-dimensional environment representation. This generally involves loading all or part of the three-dimensional representation into memory, regardless of when or how the representation was created.

The three-dimensional representation of the real-world environment may take any suitable form. For instance, the three-dimensional representation may include a plurality of discrete vertices, voxels, and/or other 3D datums mapped to discrete positions in a virtual space, where each 3D datum corresponds to a part of a real-world object or surface. In the case of a polygon mesh, the individual vertices may, for instance, correspond to where separate polygons intersect. The plurality of 3D datum comprising the three-dimensional representation may, for instance, be stored in a table or array along with their three-dimensional coordinates (e.g., XYZ or UVW coordinates).

Figure 4A:
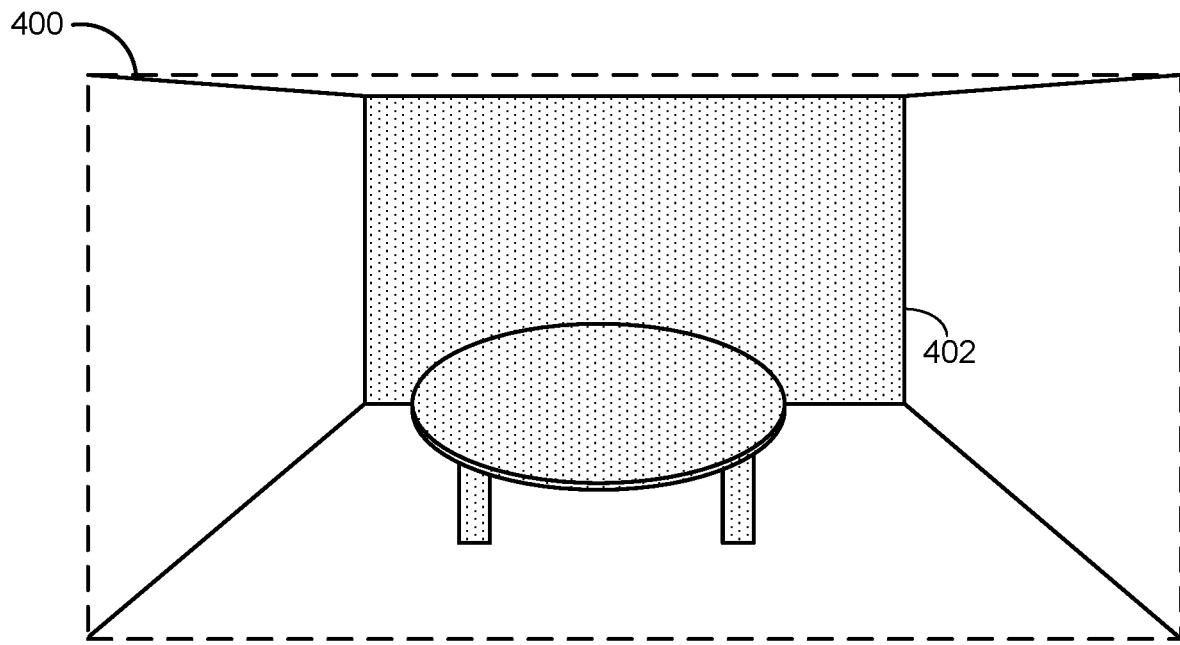
FIGS. 4A and 4B schematically illustrate recognition of virtual two-dimensional planes in a three-dimensional environment representation.

FIG. 4A schematically illustrates an example three-dimensional representation 400 of a real-world environment. Specifically, three-dimensional representation 400 depicts real-world environment 104 from FIG. 1, in which real-world table 108 is present. In FIG. 4A, both real-world table 108 and a back wall 402 of the real-world environment are filled with a dot pattern to schematically represent a dense three-dimensional representation of those elements. While the floor, ceiling, and other walls of the real-world environment are not filled with the dot pattern, this should not be taken to mean that the floor, ceiling, and other walls of the real-world environment are not mapped as part of the three-dimensional representation. Rather, it will be understood that any real-world objects and surfaces in the real-world environment may be modeled by the three-dimensional representation, for example as a plurality of discrete vertices, voxels, or other 3D datum as discussed above.

Furthermore, FIG. 4A schematically shows a graphical rendering of the three-dimensional representation, meaning the individual points are visible in a virtual space corresponding to the real-world environment. However, this is provided as a visual aid only. While a three-dimensional representation of a real-world environment may in some cases be graphically rendered for visualization, the three-dimensional representation will typically take the form of a table, array, or other non-graphical data structure.

Figure 4B:
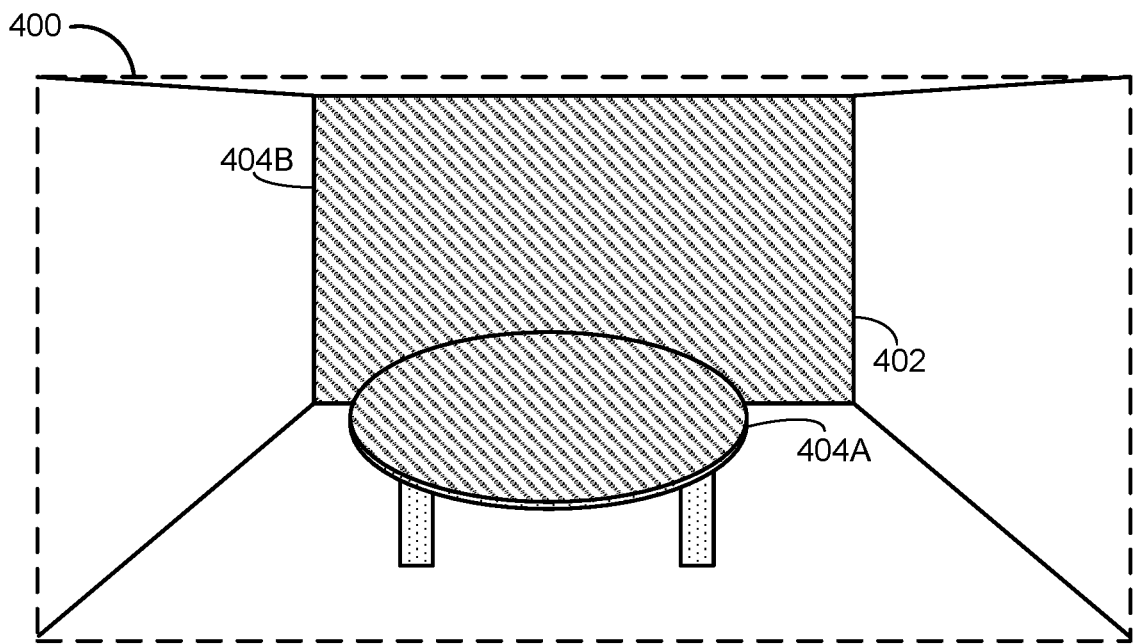

Returning briefly to FIG. 3, at 310, method 300 includes fitting virtual two-dimensional planes to real-world surfaces represented in the three-dimensional representation of the real-world environment. This is illustrated in FIG. 4B, which again shows three-dimensional representation 400 of real-world environment 104. In FIG. 4B, virtual two-dimensional planes 404A and 404B have been fitted to surfaces detected in the representation—specifically, the top face of real-world table 108 and back wall 402. Additional virtual two-dimensional planes may be fitted to the floor, walls, and ceiling of the real-world environment, as well as any other detected real-world surfaces.

Real-world surfaces may be detected in a three-dimensional representation in any suitable way and according to any suitable criteria. Firstly, the term "real-world surface" refers to substantially flat areas within a real-world environment. As examples, such surfaces can include tabletops, walls, floors, counters, desks, shelves, etc. Notably, surfaces need not be horizontal, but rather can be slanted by any suitable angle relative to a horizontal axis. Thus, surfaces may be sloping or even entirely vertical (e.g., walls).

Real-world surfaces may be recognized in the three-dimensional representation as clusters of points or voxels that are distributed across two axes and share substantially similar values according to a third axis. For instance, a horizontal surface may be indicated by a cluster of contiguous points along the X and Z axes that share similar values relative to the Y axis (other suitable axes may be used depending on the coordinate system), indicating that the points are all approximately the same height off the ground. This will hold true for slanted surfaces, albeit in a rotated coordinate system.

The real-world surfaces detected by the augmented reality device, and to which virtual two-dimensional planes are fit, need not be exactly flat. Rather, real-world objects are often textured, have slight bends (e.g., concave or convex bends), gaps, or other irregularities, though nevertheless may be identified as "real-world surfaces" on which virtual objects may be placed. Furthermore, even a perfectly flat real-world object may not be represented as being perfectly flat in the three-dimensional representation of the real-world environment due to imprecisions in sensor data or mapping of the three-dimensional representation. Thus, the augmented reality device may use any suitable flatness threshold when identifying surfaces in a three-dimensional representation. For instance, the augmented reality device may use a random sample consensus (RANSAC) plane fitting approach, in which it will be expected that some number of vertices or voxels in the three-dimensional representation will be outliers. Any potential surfaces that satisfy a threshold inlier-to-outlier ratio, or other suitable confidence threshold, may be classified as "real-world surfaces" for the purposes of fitting virtual two-dimensional planes. Further, while this disclosure primarily uses planar surfaces as an example, objects may also be placed on non-planar surfaces, which may also be found using RANSAC or other surface-finding algorithms.

The augmented reality device may in some cases filter potential surfaces on the basis of surface area. In general, it may not be desirable to label as "surfaces" any flat areas that have insufficient surface area for virtual three-dimensional object placement. Thus, in one approach, the augmented reality device may automatically identify any flat areas having at least a threshold surface area as "surfaces," and thus fit virtual two-dimensional planes to the surfaces. The threshold surface area may be, for example, one square meter.

As another example, the criteria used for classifying "surfaces," including the threshold surface area, may vary depending on the types of virtual three-dimensional objects that are available for placement. For instance, an augmented reality device may run an application that allows a user to place virtual furniture in their real-world environment to see how real-world versions of the furniture would look if purchased. Thus, the augmented reality device may only identify as "surfaces" any flat areas in the real-world environment that have a greater surface area than the bottom face of the smallest virtual furniture included in the application. Similar considerations may apply to other types of virtual three-dimensional objects.

In some implementations, in addition to or instead of defining planes based on geometric planarity, planes and/or other surfaces upon which objects can be placed may be defined by semantic class. For example, a whiteboard and a surrounding wall may be on the same plane but have different functions. As such, it may be advantageous to differentiate between the whiteboard and the surrounding wall. As one example, the augmented reality device may maintain one or more approved classes of surfaces upon which virtual object may be placed. For instance, the surrounding wall may belong to an approved class, while the whiteboard may not. Previously-trained machine learning classifiers may be used to identify and semantically label different surfaces, including two or more co-planar regions having different functions. In some implementations, a deep neural network may be used to identify and semantically label such surfaces/planes.

Furthermore, it will be understood that the real-world surfaces represented in the three-dimensional representation need not be detected by the augmented reality device itself. Rather, in some examples, such scenarios may be identified by another system, or manually identified by a human user, and tagged in the three-dimensional representation. Thus, the augmented reality device may identify surfaces in the representation without using the surface detection techniques described above.

Once real-world surfaces are identified in the three-dimensional representation of the real-world environment, the augmented reality device may fit virtual two-dimensional planes to the real-world surfaces. This may be done using any suitable plane-fitting algorithm or technique. As discussed above, the augmented reality device may use a RANSAC-based plane fitting approach. As additional non-limiting examples, the augmented reality device may use a surface reconstruction algorithm, a total least squares method, or a 3D Hough transform.

Typically, the virtual two-dimensional planes will conform to the boundaries of the surface to which they were fitted. For instance, in FIG. 4B, virtual two-dimensional plane 404A is bounded to the top surface of real-world table 108, while plane 404B covers the extent of back wall 402. This may still apply when the detected surfaces have non-rectilinear shapes—for instance, a rectangular plane is fit to the back wall while a plane having a rounded shape is fit to the real-world table. In general, a virtual two-dimensional plane may any suitable boundaries or dimensions, including curved or otherwise irregular edges. Furthermore, virtual two-dimensional planes may account for gaps, obstacles, or other irregularities within the bounds of a surface. As one example, a virtual two-dimensional plane may be interrupted by a real-world object placed on a surface. For instance, the virtual two-dimensional plane fitted to the top surface of real-world table 108 may be interrupted by a real-world book sitting on the table, while the virtual plane fitted to back wall 402 may be interrupted by a real-world clock on the wall. Such planes may also be interrupted by gaps (e.g., a hole in the center of the table), ridges or depressions, user-defined restriction zones, etc.

Returning to FIG. 3, at 312, method 300 includes receiving a request to place a virtual three-dimensional object on a real-world surface, or otherwise test placement suitability. This request may take any suitable form depending on the context in which the request is received. In one example, the augmented reality device may run an application that allows users to visualize virtual three-dimensional objects in their real-world environment. Thus, the request may be received when a user selects a particular virtual three-dimensional object for placement (i.e., executing the test for all candidate surfaces on which the selected virtual object is allowed to be placed). In other scenarios, virtual three-dimensional objects may be placed in the context of a video game, multimedia application (e.g., a user may place a virtual television or monitor on their wall), etc. Furthermore, it will be understood that the request need not specify a particular real-world surface (or virtual two-dimensional plane) that the virtual object is to be placed upon, but rather may indicate that the virtual object should be rendered in the real-world environment, at which point the user may choose which of several surfaces or planes the object will be placed upon. In some implementations, the request may be submitted via an Application Programming Interface (API) or other callable function configured to take a virtual object (and optionally a candidate plane) as input(s).

At 314, method 300 includes, for each of a plurality of candidate placement locations on a candidate virtual two-dimensional plane, evaluating whether the candidate placement location is a valid placement location or an invalid placement location for the virtual three-dimensional object. This may be done at least by determining whether a length of the three-dimensional object in a direction perpendicular to the virtual two-dimensional plane exceeds a distance between the candidate placement location and an adjacent real or virtual object.

In some implementations, the dimensions of the three-dimensional object may be represented by a bounding box that fully encloses the three-dimensional object. Thus, each dimension of the bounding box (e.g., length, width, height) may be equal to a corresponding dimension of the virtual three-dimensional object, such that the height of the entire bounding box is equal to the tallest portion of the virtual object, and so on. As such, only one distance measurement may be required to determine if the virtual three-dimensional object can be placed at a particular candidate placement location—either the entire bounding box fits between the real-world surface and adjacent real or virtual object, or at least a portion of the bounding box cannot fit, and the candidate placement location is invalid. In other implementations, however, more granular perpendicular distance measurements may be used in which the height at different portions of the virtual object is considered—for instance, by using multiple bounding boxes having different dimensions to represent different parts of the virtual object.

This is illustrated in FIG. 5A, which shows a real-world table 500 and a real-world light fixture 502 hanging over the table. A virtual two-dimensional plane 504 has been fit to the top of table 500, depicted as a rounded shape with a diagonal fill pattern. It will be understood that, while plane 504 is visible in FIG. 5A and appears to have a thickness, in typical use the virtual two-dimensional plane may have any suitable appearance and need not be visible at all.

Also shown in FIG. 5A is a virtual three-dimensional object 506 taking the form of a cone. As discussed above, upon receiving a request to place the virtual three-dimensional object, the augmented reality device may evaluate each of a plurality of candidate placement locations on any candidate virtual two-dimensional plane (e.g., virtual two-dimensional plane 504) by determining whether there is sufficient room between the candidate placement location and other real or virtual objects (e.g., between table 500 and light fixture 502) to accommodate the virtual object. This is possible because the augmented reality device has access to the three-dimensional representation of the real-world environment. Thus, the augmented reality device can determine, for each of a plurality of candidate locations on the virtual two-dimensional plane, the distance between the candidate location and the light fixture based on the three-dimensional data.

In this case, the surface of the table is horizontal, meaning the height of the virtual three-dimensional object is a limiting factor. For virtual two-dimensional planes having other orientations, the virtual three-dimensional object may be evaluated according to whichever direction is perpendicular to the virtual two-dimensional plane. This direction may be measured according to the widest portion of the virtual object in cases where the object has non-uniform dimensions. In other cases, dimensions of a bounding box associated with the virtual three-dimensional object may be used. Such a bounding box may fully enclose the virtual three-dimensional object. When a single bounding box is used, the same bounding height may be used across the full width of the virtual three-dimensional object. In other implementations, two or more bounding boxes may be used to more closely approximate more complicated shapes and therefore accommodate more virtual shape placements. When two or more bounding boxes are used, the bounding height of the virtual object can vary across the width of the virtual three-dimensional object, and thus a different distance measurement may be performed for each bounding box.

The plurality of candidate placement locations may be defined in any suitable way. In one example, the virtual two-dimensional plane may be divided into a regular or irregular grid, where each segment of the grid represents a candidate placement location. The size of each grid segment may be predetermined or alternatively may be dynamically set, for instance based on the size of the virtual two-dimensional plane, the size of the virtual three-dimensional object, etc. The distribution of candidate placement locations may further account for any gaps or irregularities in the virtual two-dimensional plane. For instance, when an underlying real-world surface has gaps or obstructions (e.g., due to the presence of a real-world object), then such gaps or obstructions may be excluded from the plurality of candidate placement locations, and/or automatically classified as invalid placement locations.

In FIG. 5A, the height of virtual cone 506 is less than the distance between the top of table 500 and light fixture 502. Thus, the virtual cone could potentially be placed at any of the candidate placement locations on the virtual two-dimensional plane, meaning all of the candidate placement locations are valid placement locations. This is not the case in FIG. 5B, in which a different virtual cone 508 is presented. The height of virtual cone 508 exceeds the distance between table 500 and light fixture 502, meaning any candidate placement locations directly under the light fixture are invalid. This is visually indicated in FIG. 5B by black box 510, representing a range of invalid placement locations. Similarly, in FIG. 5C, a virtual object 512 has an intermediate height that allows it to fit under a central portion of light fixture 502 but not under the low-hanging edges. Thus, two black boxes 514A and 514B visually represent positions of invalid placement locations on virtual two-dimensional plane 504.

It will be understood that the virtual three-dimensional object shown in FIGS. 5A-5C is presented as a nonlimiting example. Rather, any suitable virtual object having any suitable size, shape, and overall dimensions may be evaluated for placement on any suitable real-world surface. Furthermore, the length of the virtual object in the direction perpendicular to the real-world surface may be evaluated for any number of points on the virtual object (e.g., corresponding to multiple bounding boxes), and not just a single most-distant point as is shown in FIGS. 5A-5C.

In some cases, valid and invalid placement locations may be defined by an invalidation mask that is a function of the plane, the virtual object placed on the plane, and the three-dimensional representation of the real-world environment. Thus, returning to FIG. 3, at 316, method 300 includes generating an invalidation mask that defines valid and invalid placement locations on the virtual two-dimensional plane. Valid and invalid placement locations may be computed on demand by intersecting a bounding box of the hologram with the space between the virtual two-dimensional plane and an adjacent object (e.g., light fixture 502) and projecting valid regions back onto the virtual two-dimensional plane. In some examples, the invalidation mask may be rasterized as an image which is then superimposed over the real-world surface that the virtual two-dimensional plane is fitted to. However, an invalidation mask may be represented using any suitable data structure. The invalidation mask, or another suitable representation of invalid and/or valid locations may be output via an API or other callable function.

Once the invalidation mask is generated, it may be considered when placing virtual objects such that they appear to occupy a real-world environment. For instance, in FIGS. 5A-5C, virtual cones are presented that appear to occupy positions on a real-world surface. In other words, the augmented reality device may be configured to place a virtual three-dimensional object on a valid placement location of a virtual two-dimensional plane, for instance based on user input. This may include displaying the virtual three-dimensional object at a position on a real-world surface (e.g., table) that corresponds to a valid placement location identified on a virtual two-dimensional plane fit to the real-world surface.

Use of an invalidation mask may further facilitate automatic placement of virtual three-dimensional objects by the augmented reality device. For example, the augmented reality device may place the virtual three-dimensional object at the most central valid placement location on the virtual two-dimensional plane. In other words, the virtual three-dimensional object may be rendered such that it appears to occupy a position on the real-world surface that corresponds to the most central valid placement location on the virtual two-dimensional plane. In one example process, the augmented reality device may first identify valid placement locations for the virtual object on the plane. The augmented reality device may then apply a distance transform to the rasterized invalidation mask. If the portion of the invalidation mask that corresponds to a highest peak given by the distance transform is a valid placement location, then the virtual three-dimensional object may be automatically placed at that location.

Furthermore, in some examples, once the invalidation mask is generated it may be decoupled from the virtual two-dimensional plane for which it was rendered. In other words, each plane may be generated once, while each invalidation mask is generated on demand each time a request is received to place a virtual object. This may allow the augmented reality device to conserve processing resources while still providing detailed information regarding valid and invalid virtual object placement locations in the case of dynamically changing real-world environments.

Returning briefly to FIG. 3, at 318, method 300 optionally includes visually indicating positions of the valid and invalid placement locations. In other words, the augmented reality device may display virtual imagery at positions on the real-world surface that correspond to the valid and invalid placement locations of the virtual two-dimensional plane. This may be done, for instance, by rasterizing the invalidation mask as an image and superimposing the invalidation mask on the real-world surface. In FIGS. 5A-5C, as discussed above, invalid placement locations are indicated by black boxes. This is also the case in FIG. 5D, which shows an overhead view of table 500 as it appears in FIG. 5C.

However, depending on the implementation, valid and invalid placement locations may be visually indicated in any suitable way. In one example, valid placement locations may be indicated with a first color (e.g., green) while invalid placement locations are indicated with a second color (e.g., red). In another example, one type of placement location may be explicitly indicated (e.g., valid placement locations are marked) while the other type of placement location is not explicitly indicated. In further examples, other types of visual indicators or patterns may be used, such as symbols, outlines, fill patterns, etc. In this manner, it may be readily apparent which portions of a real-world surface are suitable for placing a virtual object, in contrast to locations that are unsuitable—for instance, because there is insufficient clearance above the real-world surface for the virtual object, or because there is a gap or obstruction (e.g., real-world object) in the way.

It will be understood that, while FIGS. 5A-C show a real-world light fixture overhanging table 500, this is not limiting. Rather, candidate placement locations may be evaluated for any real or virtual object near a virtual two-dimensional plane. In other words, the steps outlined above with respect to FIGS. 5A-5D would be substantially the same if the light fixture was a virtual object rather than a real-world object.

In some embodiments, the methods and processes described herein may be tied to a computing system of one or more computing devices. In particular, such methods and processes may be implemented as a computer-application program or service, an application-programming interface (API), a library, and/or other computer-program product.

Figure 6:
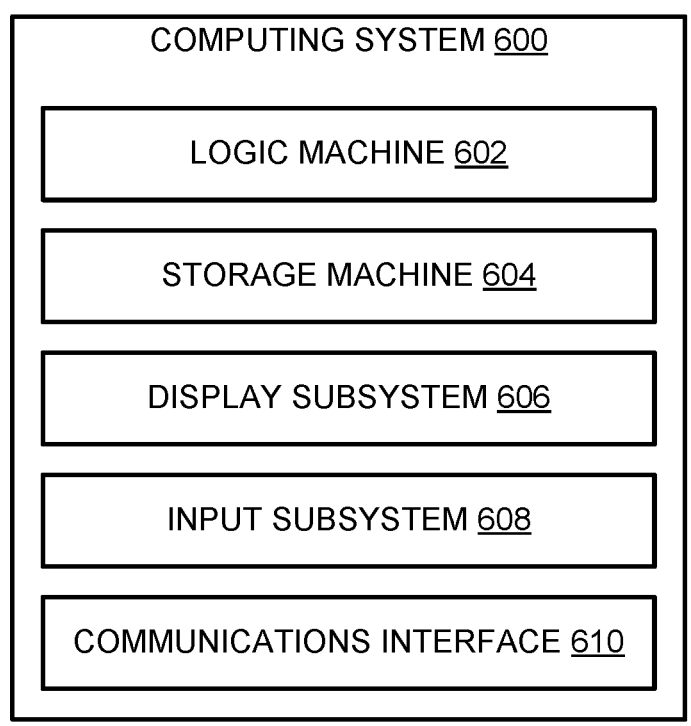
FIG. 6 schematically shows an example computing system.

FIG. 6 schematically shows a non-limiting embodiment of a computing system 600 that can enact one or more of the methods and processes described above. Computing system 600 is shown in simplified form. Computing system 600 may take the form of one or more personal computers, server computers, tablet computers, home-entertainment computers, network computing devices, gaming devices, mobile computing devices, mobile communication devices (e.g., smart phone), and/or other computing devices.

Computing system 600 includes a logic machine 602 and a storage machine 604. Computing system 600 may optionally include a display subsystem 606, input subsystem 608, communication subsystem 610, and/or other components not shown in FIG. 6.

Logic machine 602 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 604 includes one or more physical devices configured to hold instructions executable by the logic machine to implement the methods and processes described herein. When such methods and processes are implemented, the state of storage machine 604 may be transformed—e.g., to hold different data.

Storage machine 604 may include removable and/or built-in devices. Storage machine 604 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 604 may include volatile, nonvolatile, dynamic, static, read/write, read-only, random-access, sequential-access, location-addressable, file-addressable, and/or content-addressable devices.

It will be appreciated that storage machine 604 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 602 and storage machine 604 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 606 may be used to present a visual representation of data held by storage machine 604. This visual representation may take the form of a graphical user interface (GUI). As the herein described methods and processes change the data held by the storage machine, and thus transform the state of the storage machine, the state of display subsystem 606 may likewise be transformed to visually represent changes in the underlying data. Display subsystem 606 may include one or more display devices utilizing virtually any type of technology. Such display devices may be combined with logic machine 602 and/or storage machine 604 in a shared enclosure, or such display devices may be peripheral display devices.

When included, input subsystem 608 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 610 may be configured to communicatively couple computing system 600 with one or more other computing devices. Communication subsystem 610 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 600 to send and/or receive messages to and/or from other devices via a network such as the Internet.

In an example, an augmented reality device comprises a logic machine; and a storage machine holding instructions executable by the logic machine to: for one or more real-world surfaces represented in a three-dimensional representation of a real-world environment of the augmented reality device, fit a virtual two-dimensional plane to the real-world surface; receive a request to place a virtual three-dimensional object on the real-world surface; for each of a plurality of candidate placement locations on the virtual two-dimensional plane, evaluate whether the candidate placement location is a valid placement location or an invalid placement location for the virtual three-dimensional object at least by determining whether a length of the virtual three-dimensional object in a direction perpendicular to the virtual two-dimensional plane exceeds a distance between the candidate placement location and an adjacent real or virtual object; and generate an invalidation mask defining the valid and invalid placement locations on the virtual two-dimensional plane. In this example or any other example, the augmented reality device further comprises a display configured to present virtual imagery that augments a user's view of the real-world environment. In this example or any other example, the instructions are further executable to, via the display, visually indicate positions of the valid and invalid placement locations by displaying virtual imagery at positions on the real-world surface corresponding to the valid and invalid placement locations. In this example or any other example, visually indicating positions of the valid and invalid placement locations includes rasterizing the invalidation mask as an image and superimposing the rendered image on the real-world surface. In this example or any other example, valid placement locations are visually indicated using a different color than invalid placement locations. In this example or any other example, valid placement locations are indicated using a different visual pattern than invalid placement locations. In this example or any other example, the instructions are further executable to place the virtual three-dimensional object on a valid placement location of the virtual two-dimensional plane by displaying the virtual three-dimensional object at a position on the real-world surface corresponding to the valid placement location. In this example or any other example, the virtual three-dimensional object is automatically displayed at a position on the real-world surface corresponding to a most central valid placement location on the virtual two-dimensional plane. In this example or any other example, the one or more real-world surfaces are detected by the augmented reality device by identifying one or more clusters of three-dimensional voxels in the three-dimensional representation of the physical environment that are substantially parallel to two axes of a three-axis coordinate system. In this example or any other example, every real-world surface represented in the three-dimensional representation having at least a minimum surface area is fit with a corresponding virtual two-dimensional plane. In this example or any other example, every real-world surface in the three-dimensional representation identified as belonging to one or more classes upon which virtual three-dimensional objects can be placed is fit with a corresponding virtual two-dimensional plane. In this example or any other example, the instructions are further executable to receive a second request to place a second virtual three-dimensional object on the real-world surface, evaluate valid and invalid placement locations for the second virtual three-dimensional object on the virtual two-dimensional plane, and generate a second invalidation mask defining the valid and invalid placement locations on the virtual two-dimensional plane for the second virtual three-dimensional object. In this example or any other example, the three-dimensional representation of the real-world environment is generated by the augmented reality device based on one or both of visible light images and depth images of the real-world environment captured by the augmented reality device. In this example or any other example, the request to place the virtual three-dimensional object is received from a user of the augmented reality device. In this example or any other example, the plurality of candidate placement locations is arranged in a regular grid on the virtual two-dimensional plane.

In an example, a method for an augmented reality device comprises: for one or more real-world surfaces represented in a three-dimensional representation of a real-world environment of the augmented reality device, fitting a virtual plane to the real-world surface; receiving a request to place a virtual three-dimensional object on the real-world surface;

for each of a plurality of candidate placement locations on the virtual plane, evaluating whether the candidate placement location is a valid placement location or an invalid placement location for the virtual three-dimensional object at least by determining whether a length of the virtual three-dimensional object in a direction perpendicular to the virtual plane exceeds a distance between the candidate placement location and an adjacent real or virtual object; and generating an invalidation mask defining the valid and invalid placement locations on the virtual plane. In this example or any other example, the method further comprises, via a display configured to present virtual imagery that augments a user's view of the real-world environment, visually indicating positions of the valid and invalid placement locations on the virtual plane by displaying virtual imagery at positions on the real-world surface corresponding to the valid and invalid placement locations. In this example or any other example, the method further comprises automatically displaying the virtual three-dimensional object at a position on the real-world surface corresponding to a most central valid placement location on the virtual two-dimensional plane. In this example or any other example, the three-dimensional representation of the real-world environment is generated by the augmented reality device based on one or both of visual light images and depth images of the real-world environment captured by the augmented reality device.

In an example, an augmented reality device comprises: a display configured to present virtual imagery that augments a user's view of a real-world environment of the augmented reality device; a logic machine; and a storage machine holding instructions executable by the logic machine to: generate a three-dimensional representation of a real-world environment of the augmented reality device based on one or both of visible light images and depth images of the real-world environment; fit a virtual two-dimensional plane to a real-world surface detected in the three-dimensional representation; receive a request to place a virtual three-dimensional object on the real-world surface; for each of a plurality of candidate placement locations on the virtual two-dimensional plane, evaluate whether the candidate placement location is a valid placement location or an invalid placement location for the virtual three-dimensional object at least by determining whether a length of the virtual three-dimensional object in a direction perpendicular to the virtual two-dimensional plane exceeds a distance between the candidate placement location and an adjacent real or virtual object; generate an invalidation mask defining the valid and invalid placement locations on the virtual two-dimensional plane; and displaying, via the display, virtual imagery at positions on the real-world surface corresponding to the valid and invalid placement locations.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. An augmented reality device, comprising:
a logic machine; and
a storage machine holding instructions executable by the logic machine to:
fit a virtual two-dimensional plane to a real-world surface represented in a three-dimensional representation of a real-world environment of the augmented reality device;
evaluate a candidate placement location on the virtual two-dimensional plane for placement of a virtual three-dimensional object at least by determining whether a length of the virtual three-dimensional object in a direction perpendicular to the virtual two-dimensional plane exceeds a distance between the candidate placement location and an adjacent real or virtual object; and
generate an invalidation mask defining an evaluation result for the candidate placement location.

2. The augmented reality device of claim 1, where the evaluation result indicates the candidate placement location as a valid placement location at least by determining that the length of the virtual three-dimensional object in the direction perpendicular to the virtual two-dimensional plane is less than the distance between the candidate placement location and the adjacent real or virtual object.

3. The augmented reality device of claim 1, where the evaluation result indicates the candidate placement location as an invalid placement location at least by determining that the length of the virtual three-dimensional object in the direction perpendicular to the virtual two-dimensional plane exceeds the distance between the candidate placement location and the adjacent real or virtual object.

4. The augmented reality device of claim 1, where the invalidation mask defines evaluation results for each of a plurality of candidate placement locations, the evaluation results indicating whether each of the plurality of candidate placement locations is a valid placement location or an invalid placement location.

5. The augmented reality device of claim 4, where the plurality of candidate placement locations is arranged in a regular grid on the virtual two-dimensional plane.

6. The augmented reality device of claim 4, where the instructions are further executable to, via a display, visually indicate positions of the valid and invalid placement locations by displaying virtual imagery at positions on the real-world surface corresponding to the valid and invalid placement locations.

7. The augmented reality device of claim 6, where visually indicating positions of the valid and invalid placement locations includes rasterizing the invalidation mask as an image and superimposing the rendered image on the real-world surface.

8. The augmented reality device of claim 6, where valid placement locations are visually indicated using a different color than invalid placement locations.

9. The augmented reality device of claim 6, where valid placement locations are indicated using a different visual pattern than invalid placement locations.

10. The augmented reality device of claim 1, where the instructions are further executable to, based on the length of the three-dimensional object in the direction perpendicular to the virtual two-dimensional plane being less than the distance between the candidate placement location and the adjacent real or virtual object, place the virtual three-dimensional object at the candidate placement location by displaying, via a display, the virtual three-dimensional object at a position on the real-world surface corresponding to the candidate placement location.

11. The augmented reality device of claim 10, where the candidate placement location is a most central placement location on the virtual two-dimensional plane at which the length of the virtual three-dimensional object in the direction perpendicular to the virtual two-dimensional plane is less than the distance between the candidate placement location and the real or virtual object.

12. The augmented reality device of claim 1, where the real-world surface is detected by the augmented reality device by identifying one or more clusters of three-dimensional voxels in the three-dimensional representation of the physical environment that are substantially parallel to two axes of a three-axis coordinate system.

13. The augmented reality device of claim 1, where every real-world surface represented in the three-dimensional representation having at least a minimum surface area is fit with a corresponding virtual two-dimensional plane.

14. The augmented reality device of claim 1, where every real-world surface in the three-dimensional representation identified as belonging to one or more classes upon which virtual three-dimensional objects can be placed is fit with a corresponding virtual two-dimensional plane.

15. The augmented reality device of claim 1, where the instructions are further executable to receive a second request to place a second virtual three-dimensional object on the real-world surface at a second candidate placement location, evaluate the second candidate placement location for placement of the second virtual three-dimensional object, and generate a second invalidation mask defining an evaluation result for the second candidate placement location.

16. The augmented reality device of claim 1, where the three-dimensional representation of the real-world environment is generated by the augmented reality device based on one or both of visible light images and depth images of the real-world environment captured by the augmented reality device.

17. The augmented reality device of claim 1, where the candidate placement location is evaluated for placement of the virtual three-dimensional object after receiving a user input requesting placement of the virtual three-dimensional object on the real-world surface.

18. A method for an augmented reality device, comprising:
fitting a virtual two-dimensional plane to a real-world surface represented in a three-dimensional representation of a real-world environment of the augmented reality device;
evaluating a candidate placement location on the virtual two-dimensional plane for placement of a virtual three-dimensional object at least by determining whether a length of the virtual three-dimensional object in a direction perpendicular to the virtual two-dimensional plane exceeds a distance between the candidate placement location and an adjacent real or virtual object; and
generating an invalidation mask defining an evaluation result for the candidate placement location.

19. The method of claim 18, where the invalidation mask defines evaluation results for each of a plurality of candidate placement locations, the evaluation results indicating, for each of the plurality of candidate placement locations, whether the length of the virtual three-dimensional object in the direction perpendicular to the valid two-dimensional plane exceeds the distance between the candidate placement location and the adjacent real or virtual object.

20. A computing device, comprising:
a display;
a logic machine; and
a storage machine holding instructions executable by the logic machine to:
fit a virtual two-dimensional plane to a real-world surface represented in a three-dimensional representation of a real-world environment of the computing device;
evaluate a candidate placement location on the virtual two-dimensional plane for placement of a virtual three-dimensional object at least by determining whether a length of the virtual three-dimensional object in a direction perpendicular to the virtual two-dimensional plane exceeds a distance between the candidate placement location and an adjacent real or virtual object;
generate an invalidation mask defining an evaluation result for the candidate placement location; and
display, via the display, an indication of the evaluation result at a position on the real-world surface corresponding to the candidate placement location.

* * * * *